United States Patent
Bradley et al.

(10) Patent No.: US 10,157,404 B1
(45) Date of Patent: Dec. 18, 2018

(54) EVENTS SERVICE FOR ONLINE ADVERTISING

(71) Applicant: Amazon Technologies, Inc., Seattle, WA (US)

(72) Inventors: Andrew J. Bradley, Edinburgh (GB); Sebastiano Merlino, Edinburgh (GB); David Neil Turner, Edinburgh (GB); Alistair Francis Smith, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 477 days.

(21) Appl. No.: 14/669,953

(22) Filed: Mar. 26, 2015

(51) Int. Cl.
*G06Q 30/02* (2012.01)

(52) U.S. Cl.
CPC ..... *G06Q 30/0275* (2013.01); *G06Q 30/0269* (2013.01)

(58) Field of Classification Search
CPC ................................................ G06Q 30/0275
See application file for complete search history.

(56) References Cited

U.S. PATENT DOCUMENTS

| | | | | |
|---|---|---|---|---|
| 2007/0094346 | A1* | 4/2007 | Nussey | G06F 17/30867 709/217 |
| 2008/0086484 | A1* | 4/2008 | Darnell | G06F 17/3089 |
| 2010/0241745 | A1* | 9/2010 | Offen | G06Q 30/0251 709/224 |
| 2015/0242885 | A1* | 8/2015 | Alsina | G06Q 30/0246 705/14.43 |
| 2016/0239868 | A1* | 8/2016 | Demsey | G06Q 30/0255 |
| 2016/0364771 | A1* | 12/2016 | Nielsen | H04L 67/20 |

* cited by examiner

*Primary Examiner* — Grace Park
(74) *Attorney, Agent, or Firm* — Eversheds Sutherland (US) LLP

(57) ABSTRACT

This disclosure describes systems, methods, and computer-readable media related to online advertisement campaign recommendations. A server may obtain data from an events datastore indicative of missing time slices from a partition of events data. The server may obtain first events data for the missing time slices. The server may identify redundant events data in the first events data that is redundant to second events data stored in the events datastore. The server may delete the redundant events data from the first events data to generate a modified first events data. The server may transmit the modified first events data to the events datastore.

20 Claims, 5 Drawing Sheets

EVENTS SERVICE FOR ONLINE ADVERTISING

BACKGROUND

Online advertising is the delivery of promotional marketing messages to consumers over the Internet. Examples of online advertising may include email marketing, search engine marketing, social media marketing, many types of display advertising, and mobile advertising. Personalized retargeting (also known as retargeting) is a form of online targeted advertising by which online advertising is targeted based on the previous actions of a consumer, which may include actions that led to a sale or conversion as well as those actions that did not. In many instances, online advertising campaigns require advertisers to bid in real-time auctions for advertisement slots to deliver an ad impression to a consumer. However, real-time access to data from different sources may not be available to accommodate the real-time auctions for advertisement slots.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

Figure 1:
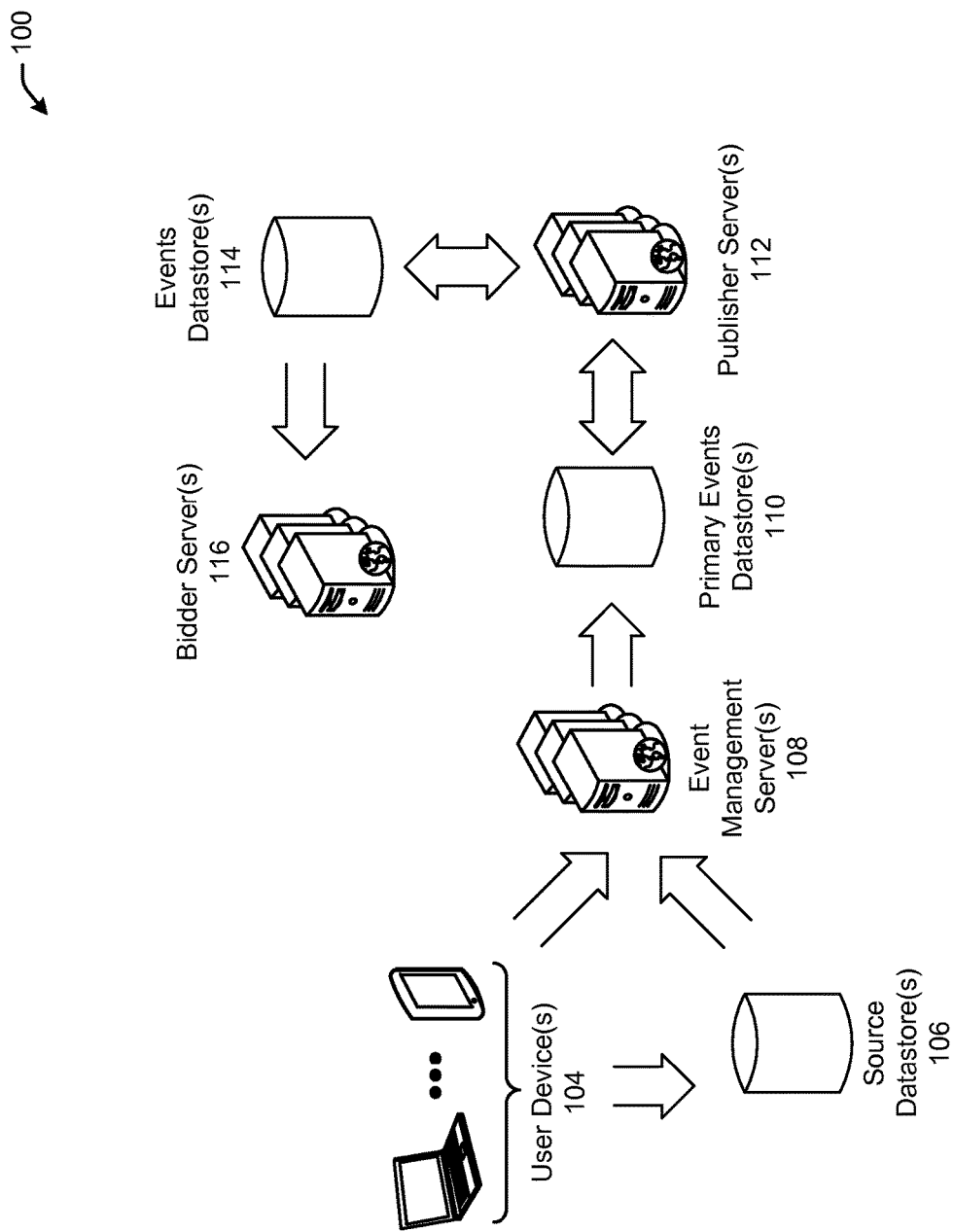
FIG. 1 depicts an illustrative data flow between various components of an illustrative system architecture for bid time data service for online advertising in accordance with one or more embodiments of the disclosure.

This disclosure relates to, among other things, systems, methods, computer-readable media, techniques, and methodologies for bid time data service for online advertising. Retargeting advertising is a form of online targeted advertising by which online advertising is targeted based on the previous actions of a consumer, which may include actions that led to a sale or conversion as well as those actions that did not. In many instances, online advertising campaigns require advertisers to bid in real-time auctions for advertisement slots to deliver an ad impression to a consumer. Selecting advertisements for personalized retargeting for consumers requires real-time access to data from different sources. The systems and methods described herein may increase the scale and efficiency of retargeted advertising. In some embodiments, the time to retarget a user may be reduced. For example, the system may select items to retarget with the highest predicted performance from the most recent events retrieved associated with the user. The events may be available for bidding within a predetermined time range (e.g., ten minutes) from when the events are published by the source provider.

Events may be generated on different user devices, which may include smartphones, laptops, tablets, wearable computing devices, set-to-boxes, televisions, and the like. Events may be transmitted to a server which may store the raw data events in a datastore. The raw data events may be stored in log files. In some embodiments, the events may be transmitted from the user devices to an event management server.

An event management server may obtain and/or receive events data from one or more sources, which may include user devices, servers, and/or datastores. The event management server may process the received events. For example, the event management server may normalize the received events data to conform to a single standard. In some embodiments, the events management server may anonymize the events data. The events management server may partition the events data. In some embodiments, the events data may be partitioned using a pre-determined time threshold, such as ten minutes. The events data may by partitioned and stored as data streams. The partitioned data may be transmitted to a primary events datastore.

In some embodiments, a publisher server may be in communication with the primary events datastore as well as an events datastore. The publisher server may receive notifications from the primary events datastore whenever new data has been added. In some embodiments, the publisher server may poll the primary events datastore at periodic intervals (e.g., every ten minutes) to identify any new data that may have been added. The events datastore may be used as a fast key value store of event data available to a bidder server to use in generating bids in response to bid requests. The publisher server may be responsible for loading the required events data for the bidder server into the events datastore. The publisher server may poll the events datastore for missing data for intervals of time and may fill the missing data for missing intervals of time with available from the primary events datastore. In some embodiments, the publisher server may poll the events datastore in predetermined increments of time, such as ten minute increments.

The terms "delivery of an advertisement," "delivery of an advertisement impression," "presentment of an advertisement impression," "serving an ad impression," or any other similar term may be used interchangeably throughout this disclosure.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Case and System Architecture

FIG. 1 depicts an illustrative data flow 100 between various components of an illustrative system architecture for bid time data service for online advertising in accordance with one or more embodiments of the disclosure.

One or more illustrative user devices 104 are illustratively depicted in FIG. 1. The user device(s) 104 may include any suitable device capable of receiving and rendering webpages and launching applications, where the webpages and applications may display one or more advertisements to be viewed by a user. The user device(s) 104 may include any suitable processor-driven computing device including, but not limited to, a smartphone or other cellular device, a tablet device, an electronic reader device, a desktop computing device, a laptop computing device, a gaming console, a multimedia content streaming device, a set-top box, wearable computing device, and so forth. In certain example embodiments, the user device(s) 104 may include a television such as, for example, a smart TV, an Internet Protocol television (IPTV), or the like. For ease of explanation, the user device(s) 104 may be described herein in the singular; however, it should be appreciated that multiple user devices 104 may be provided.

In various example embodiments, a user application (e.g., a browser application) executing on a user device 104 may transmit events (e.g., shopping events, conversion events, etc.) to one or more server(s) (not pictured) which may store the events in one or more source datastore(s) 106. In some embodiments, the user device(s) 104 may transmit one or more event(s) to one or more event management server(s) 108.

An event management server 108 may receive the event data (e.g., raw event data) from the multiple user device(s) 104 and/or one or more source datastore(s) 106 and may facilitate processing the event data. The event management server 108 may transmit all or a portion of the processed event data to one or more primary events datastore(s) 110.

In some embodiments, the bidder server 116 may receive and respond to bid requests from one or more ad exchange server(s) (not pictured). The bidder server 116 may obtain events from the events datastore 114 to generate a bid in request to a bid request from the ad exchange server(s). In some embodiments, the events may include past impressions and state information associated with a session associated with a user. The events may be used to select an event with the highest predicted value to retarget.

The events datastore 114 may be a fast key value store of event data that may be used by the bidder server 116 to response to bid requests. The events datastore 114 may be keyed by a session identifier and a key prefix for each data set. The stored values may be sorted sets of strings representing each event, ordered by the timestamp of the event. The use of sorted sets allows the events datastore 114 to be accessed by either time or index and writes to be idempotent.

The events datastore 114 may be populated by one or more publisher servers 112. Publisher servers may be responsible for loading the required input data for the bidder server 116 to use to the events datastore 114. In some embodiments, the publisher servers 112 may generate data set keys (e.g., events data set key, impressions data set key, and/or session data set keys) in addition to the events data. Additionally, an index may be generated and maintained for the events datastore 114, listing the partitions and events stored in the events datastore 114. The index may be used to identify data missing for intervals of time.

In some embodiments, the publisher server 112 may poll or otherwise communicate with the events datastore 114 to identify missing data from intervals of time (e.g., data associated with a specific range of time). If the publisher server 112 identifies missing data for a particular interval of time, the publisher server may obtain the missing data for the interval of time from the primary events datastore 110. By having the publisher supplement the events datastore 114 with data from the primary events datastore 110, the bidder server 116 may have sufficient data to generate bids in response to bid requests for online advertising.

Figure 2:
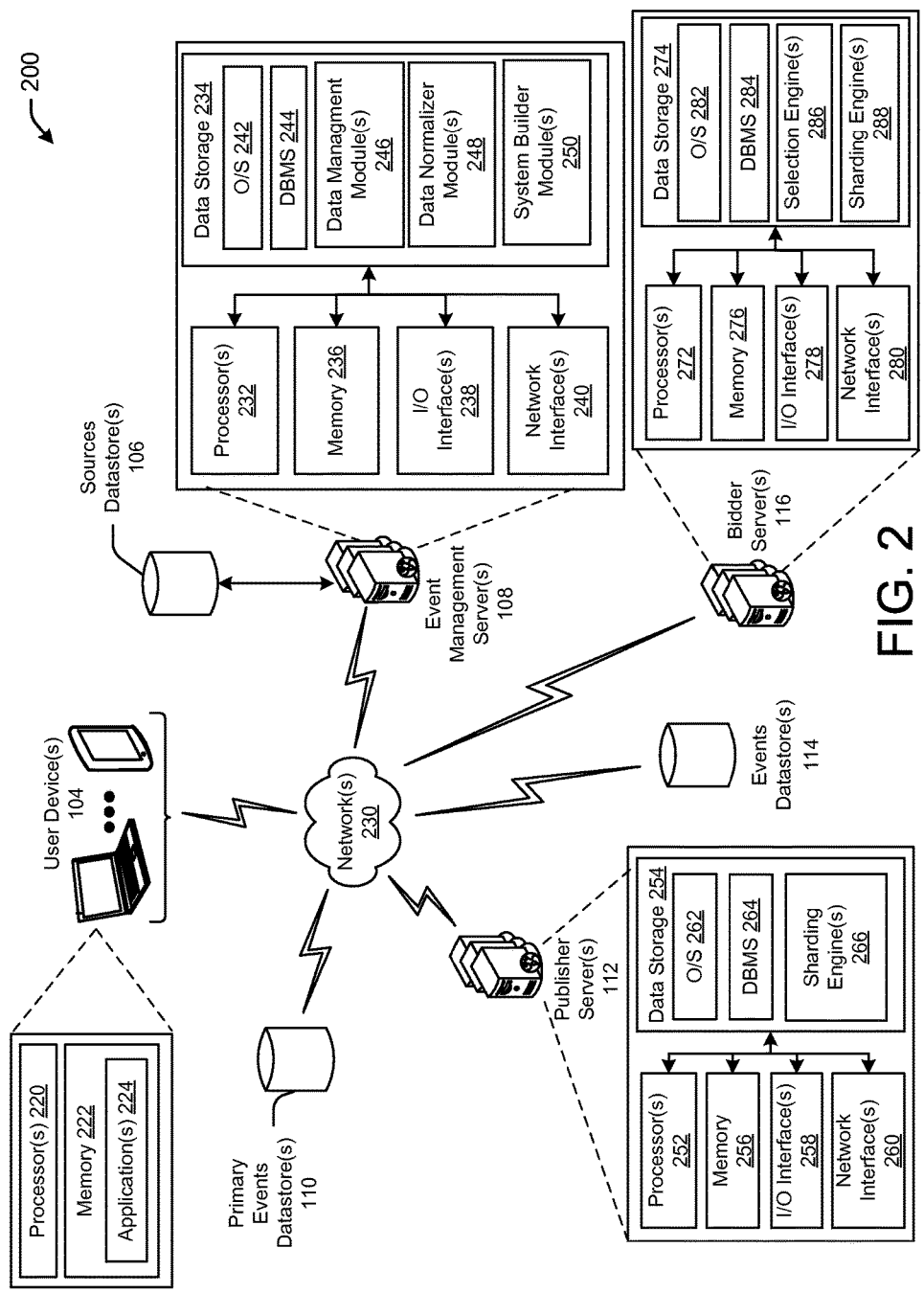
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture 200 depicted in FIG. 1 in accordance with one or more embodiments of the disclosure. FIG. 2 includes a user device 104, a sources datastore 106, an event management server 108, a primary events datastore 110, a publisher server 112, an events datastore 114, and a bidder server 116. Each component may be connected via network 230.

Any of the user device(s) 104, sources datastore(s) 106, event management server(s) 108, primary events datastore(s) 110, publisher server(s) 112, events datastore(s) 114, and/or bidder server(s) 116 may be configured to communicate with each other and any other component of the architecture 200 via one or more network(s) 230. The network(s) 230 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 230 may have any suitable communication range associated therewith and may include, for example, global networks (e.g., the Internet), metropolitan area networks (MANs), wide area networks (WANs), local area networks (LANs), or personal area networks (PANs). In addition, the network(s) 230 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Referring now to the user device 104, the user device 104 may include one or more processor(s) 220 and one or more memory devices 222 with a user application 224 stored thereon. The user device 104 may also include various additional components, such as one or more input device(s), I/O interface(s), radio/antennas, network interface(s), and other components. The user device 104 may also include an operating system configured to provide an interface between software and hardware resources of the user device 104, and/or database management systems configured to support functionality of the memory 222. The user device 104 may include system busses that functionally couple various components of the user device 104. In other embodiments, the user device 104 may include additional or fewer components.

The memory 222 may include one or more program modules, applications, or the like, such as the user application 224. One or more user applications 224 may be loaded into the memory 222. The user applications 224 may be any application(s) capable of facilitating the display of or otherwise presenting advertisement impressions to the user 102. The user applications 224 may include, but are not limited to, a web-based browser application, a dedicated software application (e.g., a smart phone application, a tablet application, etc.), a mobile browser application, and so forth. The user application 224 may be configured to render web pages on a respective user device 104. Any data may be loaded into the memory 222 for use by the processor(s) 220 in executing computer-executable code. The user device 104 may be configured to access, store, and/or retrieve data in or from one or more datastore(s). The user device 104 may also include communications connection(s) that allow the user device 104 to communicate with datastores, other computing devices or servers, user terminals, and/or other devices via the network(s) 230.

The user device 104 may be any suitable user device including, but not limited to, a mobile device, such as a smartphone, tablet, e-reader, or the like; a desktop computer; a laptop computer, a game console, a personal media player, a wearable computer device, and so forth. The user device 104 may be configured to present or serve ad impressions to users 102. The user device 104 may be configured to operate in various operational modes and may be configured to present electronic content and ad impressions.

The sources datastore(s) 106 may receive events data from different sources, such as user device(s) 104, source server(s), and/or other datastore(s).

Now referring to the event management server(s) 108, the event management server(s) 108 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from the data storage 234 and loaded into the memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into the memory 236 as needed for execution. Depending on the configuration and implementation of the event management server(s) 108, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The event management server(s) 108 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The event management server(s) 108 may further include network interface(s) 240 that facilitate communication between the ad measurement server 106 and other devices of the illustrative system architecture 200 (e.g., user device(s) 104, primary events datastore(s) 110, etc.) or application software via the network(s) 230. The event management server(s) 108 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 234, various program modules, applications, or the like may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the event management server(s) 108 and the hardware resources of the event management server(s) 108. More specifically, the O/S 242 may include a set of computer-executable instructions for managing the hardware resources of the event management server(s) 108 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores (e.g., ad attribution datastore 112). The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more data management modules 246, one or more data normalizer module(s) 248, and/or one or more system builder module(s) 250.

The data management module(s) 246 may include computer-executable instructions that in response to execution by the processor(s) 232 cause operations to be performed including receiving or otherwise obtaining events data from one or more sources, such as user device(s) 104, sources datastore(s) 106, server(s) and the like. The data management module 246 may transmit the data obtained from one or more sources to the data normalizing module(s) 248 for processing. The data management module 246 may receive normalized event data from the data normalizer module(s) 248 and/or the system builder module(s) 250 and may transmit the normalized events data to the primary events datastore 110, for storage.

The data normalizer module 248 may include computer-executable instructions that upon execution by the processor(s) 232 configures the processor(s) 232 to obtain or otherwise receive data from the data management module 246. The data normalizer module 248 may use one or more models and/or techniques to process the data received from the data management module 246 to normalize data from different sources. In some embodiments, the data management module 246 may use one or more rules configured by an administrator to normalize the events data. In some embodiments, the data normalizer module 248 may anonymized the events data (e.g., before or after being normalized) using one or more known methods or techniques to strip identifying information from the events data. For example, in some embodiments, the data normalizer module 248 may apply a one-way hash to the events data for anonymization. The data normalizer module 248 may then transmit the data back to the data management module 248.

The system builder module 250 may include computer-executable instructions that upon execution by the processor(s) 232 configures the processor(s) 232 to obtain or otherwise receive data from the data normalizer module 248. The system builder module 250 may partition the normalized events data using one or more time thresholds. For example the system builder module 250 may partition the normalized events into ten minute partitions and may save the events data as data streams. The system builder module 250 may then transmit the events data back to the data management module 248.

Within the data storage 234, one or more modules may be stored. As used herein, the term module may refer to a functional collection of instructions that may be executed by the one or more processor(s) 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The publisher server(s) 112 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from the data storage 254 and loaded into the memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into the memory 256 as needed for execution. Depending on the configuration and implementation of the publisher server(s) 112, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The publisher server(s) 112 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The publisher server(s) 112 may further include network interface(s) 260 that facilitate communication between the publisher server(s) 112 and other devices of the illustrative system architecture 200 (e.g., user device(s) 104, primary events datastore(s) 110, etc.) or application software via the network(s) 230. The publisher server(s) 112 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the publisher server(s) 112 and the hardware resources of the publisher server(s) 112. More specifically, the O/S 262 may include a set of computer-executable instructions for managing the hardware resources of publisher server(s) 112 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more sharding engine(s) 266.

The sharding engine 266 may include computer-executable instructions, code, or the like, that, responsive to execution by the processor(s) 252, may cause the sharding engine 266 to poll the events datastore 114 at periodic intervals to determine whether the events datastore was missing any data for intervals of time. If the sharding engine 266 determined data was missing for an interval of time, then the sharding engine 266 may communicate with the primary events datastore 110 to obtain the missing data. The sharding engine 266 may then process the retrieved data and identify data that would complete the data in the events datastore 114.

Within the data storage 254, one or more modules may be stored. As used herein, the term module may refer to a functional collection of instructions that may be executed by the one or more processor(s) 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The bidder server(s) 116 may include one or more processors (processor(s)) 272) and one or more memories 276 (referred to herein generically as memory 276). The processor(s) 272 may include any suitable processing unit capable of accepting digital data as input, processing the input data based on stored computer-executable instructions, and generating output data. The computer-executable instructions may be stored, for example, in the data storage 274 and may include, among other things, operating system software and application software. The computer-executable instructions may be retrieved from the data storage 274 and loaded into the memory 276 as needed for execution. The processor(s) 272 may be configured to execute the computer-executable instructions to cause various operations to be performed. The processor(s) 272 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 274 may store program instructions that are loadable and executable by the processor(s) 272, as well as data manipulated and generated by the processor(s) 272 during execution of the program instructions. The program instructions may be loaded into the memory 276 as needed for execution. Depending on the configuration and implementation of the bidder server(s) 116, the memory 276 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 276 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The bidder server(s) 116 may further include additional data storage 274 such as removable storage and/or non-removable storage including, but not limited to, magnetic storage, optical disk storage, and/or tape storage. Data storage 274 may provide non-volatile storage of computer-executable instructions and other data. The memory 276 and/or the data storage 274, removable and/or non-removable, are examples of computer-readable storage media (CRSM).

The bidder server(s) 116 may further include network interface(s) 280 that facilitate communication between the bidder server(s) 116 and other devices of the illustrative system architecture 200 (e.g., user device(s) 104, events datastore 114, etc.) or application software via the network(s) 230. The bidder server(s) 116 may additionally include one or more input/output (I/O) interfaces 278 (and optionally associated software components such as device drivers) that may support interaction between a user and a variety of I/O devices, such as a keyboard, a mouse, a pen, a pointing device, a voice input device, a touch input device, a gesture capture or detection device, a display, speakers, a camera, a microphone, a printer, and so forth.

Referring again to the data storage 274, various program modules, applications, or the like may be stored therein that may comprise computer-executable instructions that when executed by the processor(s) 272 cause various operations to be performed. The memory 276 may have loaded from the data storage 274 one or more operating systems (O/S) 282 that may provide an interface between other application software (e.g., dedicated applications, a browser application, a web-based application, a distributed client-server application, etc.) executing on the bidder server(s) 116 and the hardware resources of the bidder server(s) 116. More specifically, the O/S 282 may include a set of computer-executable instructions for managing the hardware resources of the bidder server(s) 116 and for providing common services to other application programs (e.g., managing memory allocation among various application programs). The O/S 282 may include any operating system now known or which may be developed in the future including, but not limited to, any mobile operating system, desktop or laptop operating system, mainframe operating system, or any other proprietary or open-source operating system.

The data storage 274 may further include one or more database management systems (DBMS) 284 for accessing, retrieving, storing, and/or manipulating data stored in one or more datastores. The DBMS 284 may use any of a variety of database models (e.g., relational model, object model, etc.) and may support any of a variety of query languages.

The data storage 274 may additionally include various other program modules that may include computer-executable instructions for supporting a variety of associated functionality. For example, the data storage 274 may include one or more selection engine(s) 286 and/or sharding engine(s) 288.

The selection engine 286 may include computer-executable instructions, code, or the like, that, responsive to execution by the processor(s) 272, may cause the selection engine 286 to analyze one or more received bid requests. The selection engine 286 may identify an auction for an advertising slot and request information from the sharding engine 288. The selection engine 286 may receive the information from the sharding engine 288 and may generate a bid using the received data.

The sharding engine 288 may include computer-executable instructions, code, or the like, that, responsive to execution by the processor(s) 272, may cause the selection engine 286 to analyze one or more received bid requests. The sharding engine 288 receive a request for information from the selection engine 286. The request may include a time range or the like, which may be used by the sharding engine 288 to obtain events from the events datastore 114. The sharding engine 288 may obtain an index of the partitions of data from the events datastore 114.

Within the data storage 274, one or more modules may be stored. As used herein, the term module may refer to a functional collection of instructions that may be executed by the one or more processor(s) 272. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the system architecture 200 may include alternate and/or additional hardware, software, or firmware components beyond those described or depicted without departing from the scope of the disclosure. More particularly, it should be appreciated that hardware, software, or firmware components depicted or described as forming part of any of the illustrative components of the system architecture 200, and the associated functionality that such components support, are merely illustrative and that some components may not be present or additional components may be provided in various embodiments. While various program modules have been depicted and described with respect to various illustrative components of the system architecture 200, it should be appreciated that the functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of hardware, software, and/or firmware for implementing the functionality. Accordingly, it should be appreciated that the functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative system architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative system architecture 200, or additional functionality.

Illustrative Data Flow

Figure 3:
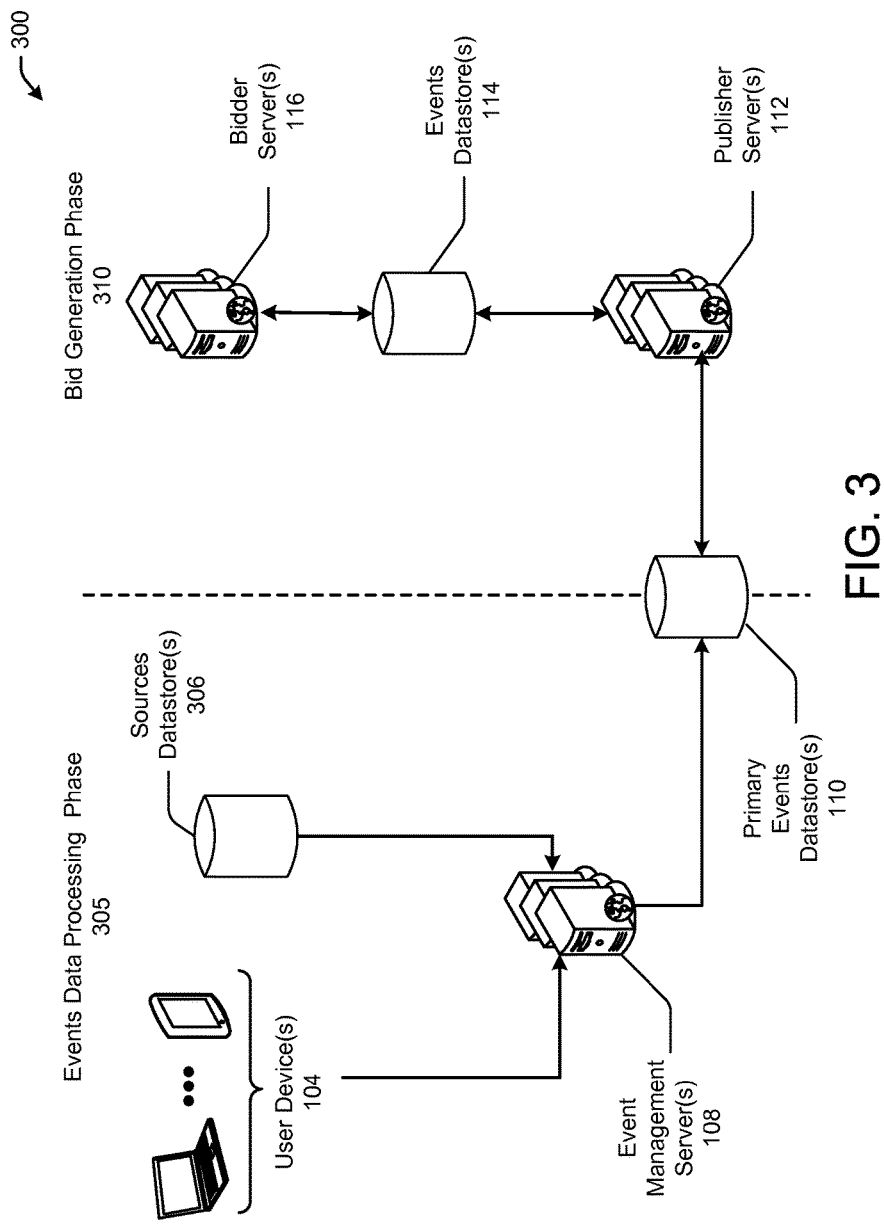
FIG. 3 is an example data flow of a system for bid time data service for online advertising in accordance with one or more embodiments of the disclosure.

FIG. 3 is an example data flow 300 of a system for bid time data service for online advertising in accordance with one or more embodiments of the disclosure. In some embodiments, the data flow 300 may be divided into two phases, the events data processing phase 305 and the bid generation phase 310. In some embodiments, the two phases may occur in parallel and/or asynchronously.

The events data processing phase 305 may include obtaining event data from different sources. Event data may be generated by different devices and servers, such as laptops, smartphones, tablets, web servers, or the like. Event data may include conversion event and/or ad traffic data, which may be generated and stored in different datastores, such as sources datastore(s) 106. In some embodiments, the event data may be obtained by the data management module 246 of the events management server 108. The events data may then be processed by the events management sever 108. For example, the data normalizer module 248 and/or the system builder module 250 may process the events data, which may be in the form of data logs. The data logs may be normalized and then anonymized by the data normalizer module 248. In some embodiments, the system builder module 250 may use the normalized logs and may partition to the events data using a configurable time threshold. For example, the system builder module 250 may partition the normalized events data into partitions of ten minutes. The partitions may include events that occurred within the specified ten minute range. The partitions may be transmitted to one or more primary events datastores 110 by the data management module 246.

In the bid generation phase 310, the bidder server 116 may receive bid requests from different servers, such as an ad exchange server. The selection engine 286 of the bidder server 116 may identify an advertisement slot from a bid request and may request data from the sharding engine 288 of the bidder server 116. The sharding engine 288 may identify one or more data of one or more time intervals to be retrieved from the events datastore 114 to be used in the bid generation by the selection engine 286.

The sharding engine 288 of the bidder server 116 may request data for one or more time intervals from the events datastore 114. Each time interval may include a maximum number of events for a given time range (e.g., ten minutes). For example, each time interval may include up to 250 events that may be associated with a user for an identified ten minute interval. In some embodiments, the publisher server 112 may poll the events datastore 114 at periodic time intervals (e.g., every 30 minutes, hourly, etc.) and may determine whether any data from any time intervals (or portion thereof) are missing. The publisher server 112 may then obtain the missing data from the primary events datastore 110. The publisher server 112 may then write the data to the events datastore 114. The publisher server 112 may scan the events datastore 114 to identify any redundant events and remove any redundant events that may already be stored on the events datastore 114.

Illustrative Processes

Figure 4:
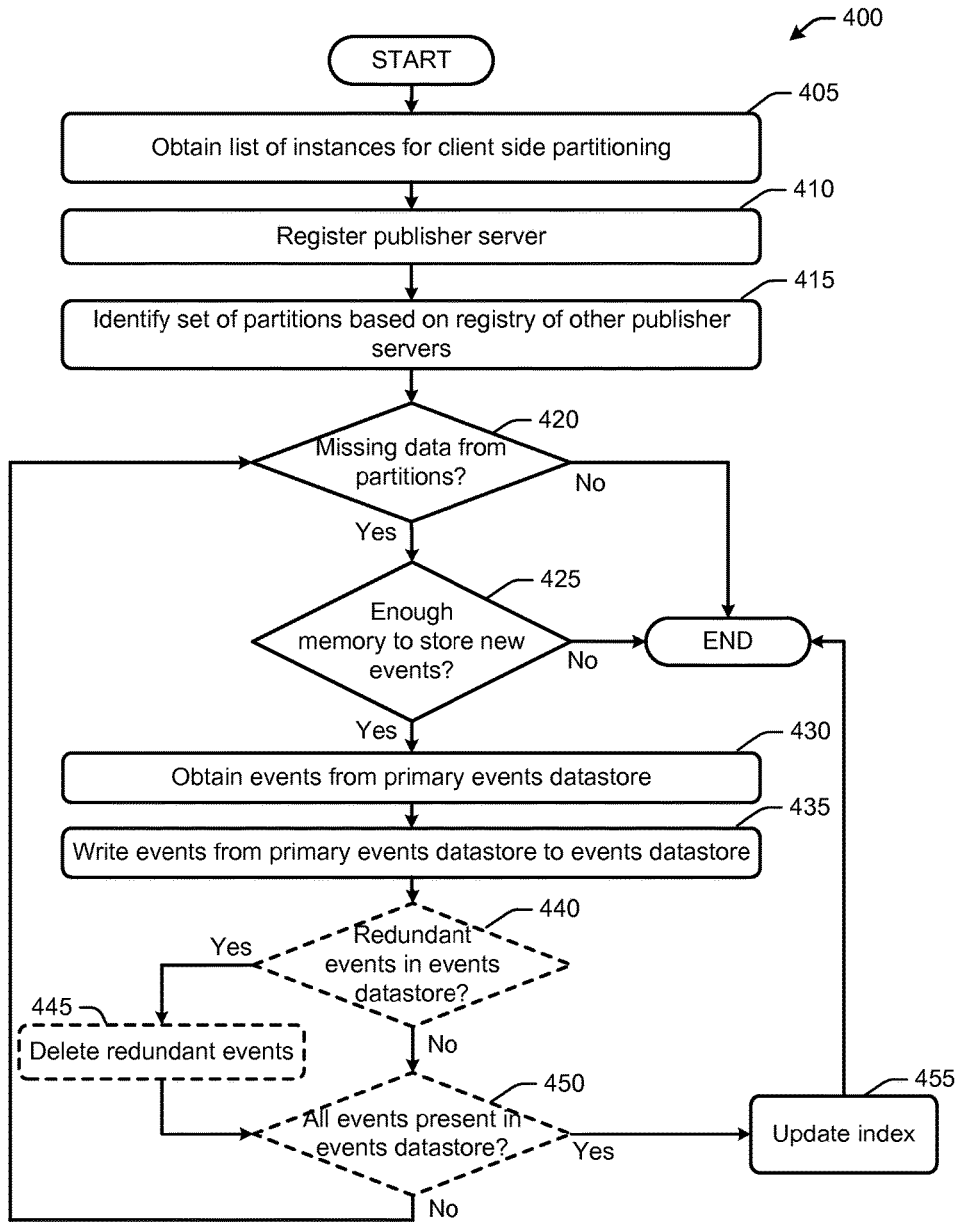
FIG. 4 is a process flow diagram of an illustrative method for bid time data service for online advertising in accordance with one or more embodiments of the disclosure.

FIG. 4 is a process flow diagram of an illustrative method 400 for bid time data service for online advertising in accordance with one or more embodiments of the disclosure.

At block 405, the publisher server 112 may obtain a list of instances of the events datastores 114 for client side partitioning. The publisher server 112 may obtain the list of events datastores 114 instances from a registry of a database service. At block 410, the publisher server 112 may register itself as a publisher. The publisher server 112 may register itself as a publisher through the database service. At block 415, the publisher server 112 may identify a set of partitions it is responsible for based on a registry of other publisher servers. For example, the publisher server 112 may identify the partitions associated with other publisher servers and may identify partitions that are not associated with other publisher servers. The publisher server 112 may then associated itself with the identified partitions for which it is now responsible.

At block 420, a determination may be made as to whether there are missing data from one or more time intervals of a partition. For each file system and partition, a set key may be maintained in the events datastore 114 describing which events have been loaded for the partition. The set key may be used by the publisher server 112 to determine which work needs to be done, and by the bidder server 116 to identify where data is missing. If it is determined that there are no missing data from time intervals of the partition of the events datastore 114, then the method may terminate. In some embodiments, an index of the events datastore 114 may be used to track partitions of data and any missing data from time intervals of partitions. If it is determined that data is missing from time intervals of the partition(s) of the events datastore 114, the method may proceed to block 425.

At block 425, a determination may be made as to whether there is sufficient memory in the events datastore 114 to store new events. In some embodiments, the publisher server 112 may determine the amount of available memory associated with the events datastore 114. The amount of available memory may be compared to a memory amount threshold. If the amount of available memory is greater than or equal to the threshold, it may be determined that there is sufficient memory in the events datastore 114 to store new events. If the amount of available memory is less than the threshold, then there may not be sufficient memory in the events datastore 114 to store new events. If it is determine that there is insufficient memory to store the new events, then the method may terminate. If it is determined there is sufficient memory, then the method may proceed to block 430.

At block 430, events may be obtained from the primary events datastore 110. In some embodiments, the sharding engine 266 of the publisher server 112, may poll the primary events datastore 110 to determine whether the new data is available. In some embodiments, the sharding engine 266 of the publisher server 112 may receive notifications from the primary events datastore 110 when new data is available. When, at block 420, it was determined that data missing from a time interval of a partition, the publisher server 112 may identify which the events of the partition was missing (e.g., from the set key or index of the events datastore 114) and may request the missing events from the primary events datastore 110.

At block 435, the sharding engine of the publisher 112 may write the events obtained from the primary events datastore 110 to the events datastore 114.

At optional block 440, a determination may be made whether there are redundant events in the events datastore 114. In some embodiments, prior to writing the events to the events datastore 114, the sharding engine 266 may compare the obtained events from the primary events datastore 110 with the events stored in the events datastore 114. As events are driven by user behavior, sessions can have an unbounded number of them—this has consequences for the storage required by the system and bidder performance. The redundant event removal process determines which events are no longer valuable to retain. After writing a new event to a key, it reads back all the events now stored to the key and identifies events for removal based on an appropriate algorithm for each file system. By removing events, rather than mutating their content, this avoids the events datastore 114 from becoming stateful. Redundant event removal is idempotent and does not require locking.

In some embodiments, the sharding engine 266 may scan the events stored in the events datastore 114 after the new events have been written to the events datastore (e.g., from block 435) to identify any redundant events. If the sharding engine 266 identifies any redundant events, then at block 445, the sharding engine 266 may delete the events from the events datastore 114.

The method may proceed to block 450 if at block 440, it is determined that there are no redundant events in the events datastore 114 or from block 445 after redundant blocks have been deleted from the events datastore 114. At optional block 450, a determination may be made, by the sharding engine 266, whether all the events are present in the events datastore 114. The sharding engine 266 may scan the events datastore 114 to determine if there are any events missing from any intervals of time or partitions of the events datastore 114. If at block 450, it is determined that all events are present in the events datastore 114, then the method may proceed to block 455 where the index is updated to reflect the addition of events to the events datastore. In some embodiments, the set key may be updated to reflect that addition of events to the events datastore 114. If at block 450, it is determined that all events are not present, then the method may proceed back to block 420, where missing events may be identified and added to the events datastore 114 as outlined in blocks 420-450. The method may then terminate when a determination is made that the events datastore 114 is not missing any events.

Figure 5:
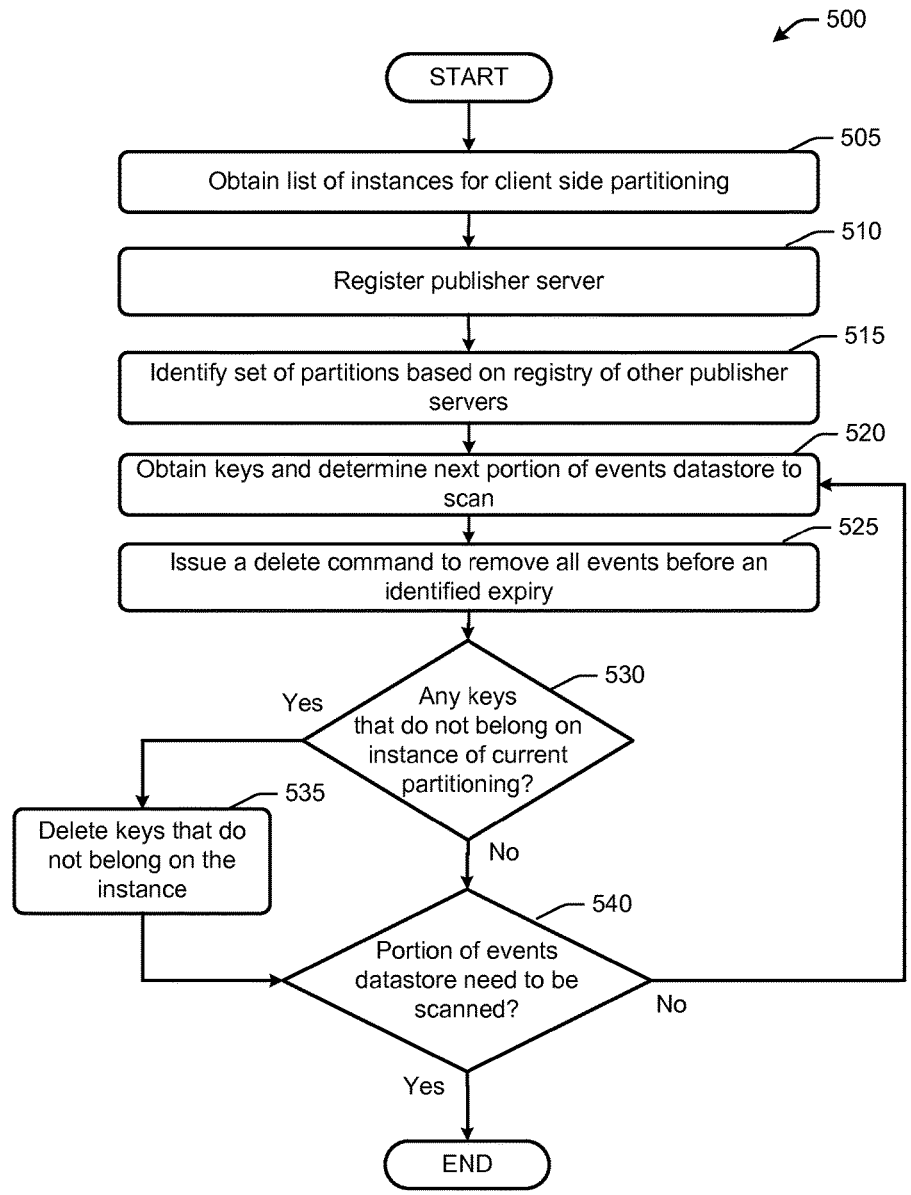
FIG. 5 is a process flow diagram of an illustrative method for event expiry for bid time data service for online advertising in accordance with one or more embodiments of the disclosure.

FIG. 5 is a process flow diagram of an illustrative method 500 for event expiry for bid time data service for online advertising in accordance with one or more embodiments of the disclosure. In some embodiments, keys may be generated using three input data sets—events, session states, and impressions. Events may reflect user activity, such as page views, searches, and purchases. The session states may record transition of a customer session, such as country of residence and whether the user is signed in. Impressions may reflect impression counts associated with a product or service. The keys may be used during expiry scans. The keys may indicate which data set and partition the key belongs.

At block 505, the publisher server 112 may obtain a list of instances of the events datastores 114 for client side partitioning. The publisher server 112 may obtain the list of events datastores 114 instances from a registry of a database service. At block 510, the publisher server 112 may register itself as a publisher. The publisher server 112 may register itself as a publisher through the database service. At block 515, the publisher server 112 may identify a set of partitions it is responsible for based on a registry of other publisher servers. For example, the publisher server 112 may identify the partitions associated with other publisher servers and may identify partitions that are not associated with other publisher servers. The publisher server 112 may then associated itself with the identified partitions for which it is now responsible.

At block 520, the publisher server 112 may obtain keys from the events datastore 114 and may determine or identify the next portion of the events datastore 114 to scan. In one embodiment, the events datastore 114 may utilize a next scan cursor, which is indicative of a next location in the events datastore 114 to scan. At block 525, the publisher server may issue a delete command to remove all events before an identified expiry. At block 530, a determination may be made as to whether there are any keys that do not belong on the instance of the current partitioning. If it is determined that there are no keys that do not belong on the instance of the current partitioning, then the method may proceed to block 540. If it is determined that there are keys that do not belong on the instance of the current partitioning, then the method may proceed to block 535, where the keys that do not belong on the instance are deleted. In some embodiments, the next location of the events datastore 114 to be scanned may be determined. For example, the next scan cursor may be advanced to a next location. In some embodiments, if there is not a next location, the next scan cursor may be set to zero. The method may proceed to block 540.

At block 540, the publisher server may determine whether there are any other portions of the events datastore 114 that need to be scanned. For example, the publisher server 112 may determine if the next scan cursor has returned to 0. If the next scan cursor has returned to 0, then the method may terminate. If the next scan cursor has not returned to 0, then the method may proceed back to step 520.

In some embodiments, the system architecture may not utilize load balancers to distribute work among the different publisher server(s) 112. Accordingly, publisher server(s) 112 may need to ensure that they do not overload the events datastores with writes of events data. In some embodiments, publisher server(s) 112 may be configured with throttles appropriate for the amount of work they must complete during their builds.

In some embodiments, the system architecture 200 may include features for error/threat handling. For example, if there is a failure of the events datastore 114, the bidder server 116 may be able to continue to bid using the remaining data. In the event that bad data has been published to an events datastore 114, an error handling agent may be deployed with a version tag which instructs the publisher server 112 to flush the events datastore 114 and retrieve new data to populate the events datastore 114.

In some embodiments, large sessions of data may be reduced by the publisher server 112 to ensure that the events datastore 114 is not overloaded.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
   registering as a publisher server with a database service registry;
   obtaining a list of instances of events datastores from the database service registry;
   identifying an instance of an events datastore from the list of instances of the events datastore, wherein the events datastore is associated with a fast key index value, wherein the fast key index value comprises one or more of a version tag, a session identifier, or a set of event keys and a next scan cursor;

determining an association with the instance of the events datastore;
receiving a notification from the events datastore, wherein the notification is indicative of missing events for an interval of time from a partition of events data;
determining, based at least in part on the fast key index value and the notification, the missing events;
sending a request to a primary events datastore, the request indicating the missing events;
obtaining, from the primary events datastore, events data for the missing events;
transmitting the events data to the events datastore;
identifying redundant events data in the events datastore;
deleting the redundant events data from the events datastore; and
modifying the fast key index value to include the events data.

2. The non-transitory computer-readable medium of claim 1, wherein the notification comprises an indication of the fast key index value.

3. The non-transitory computer-readable medium of claim 1, the operations further comprising:
receiving, by the server, the version tag from the events datastore;
purging, by the server, data in the events datastore;
retrieving, by the server, new data from the primary events datastore based on the version tag; and
populating, by the server, the events datastore using the new data.

4. A computer-implemented method comprising:
receiving, by a server comprising one or more processors, a notification from an events datastore, wherein the events datastore is associated with a fast key index value, and wherein the fast key index value comprises one or more of a version tag, a session identifier, or a set of event keys and a next scan cursor, and wherein the notification is indicative of missing events for an interval of time of a partition of events data;
determining, by the server, based at least in part on the fast key index value and the notification, the missing events;
sending, by the server, a request to a primary events datastore, the request indicating the missing events;
obtaining, by the server from the primary events datastore, events data for the missing events;
transmitting, by the server, the events data to the events datastore; and
updating, by the server, the fast key index value to include the events data.

5. The computer-implemented method of claim 4, further comprising:
registering, by the server, as a publisher server with a database service registry;
obtaining, by the server, a list of instances of events datastores from the database service registry;
identifying, by the server, the instance of the events datastore from the list of instances of the events datastore; and
determining, by the server, an association with the instance of the events datastore.

6. The computer-implemented method of claim 4, further comprising:
determining, by the server, whether the events data are first in a session;
in response to determining the events data is first in the session, generating a new events key; and
in response to determining the events is not first in the session, modifying an existing events key associated with the session.

7. The computer-implemented method of claim 4, further comprising:
obtaining, by the server, a first set of event keys and a first next scan cursor from the events datastore;
issuing, by the server, a delete range to remove all events before an identified expiry; and
deleting, by the server, at least one key before the identified expiry.

8. The computer-implemented method of claim 7, further comprising:
analyzing, by the server, the first set of event keys to identify at least one key that does not belong on the instance of the events datastore; and
deleting, by the server, the at least one key.

9. The computer-implemented method of claim 4, wherein the notification comprises an indication of the fast key index value.

10. The computer-implemented method of claim 4, further comprising:
receiving, by the server, a version tag from the events datastore;
purging, by the server, data in the events datastore;
retrieving, by the server, new data from the primary events datastore based on the version tag; and
populating, by the server, the events datastore using the new data.

11. The computer-implemented method of claim 10, wherein populating the events datastore further comprises:
generating, by the server, a new events data set key using the new data;
generating, by the server, a new session data set key using the new data; and
generating, by the server, a new impressions data set key using the new data.

12. The computer-implemented method of claim 4, further comprising:
polling, by the server, the primary events datastore at predetermined time intervals to obtain a latest set of data.

13. The computer-implemented method of claim 4, further comprising:
identifying, by the server, redundant events data in the events datastore; and
deleting, by the server, the redundant events data from the events datastore.

14. The computer-implemented method of claim 4, further comprising:
verifying, by the server, the events datastore is not missing events.

15. A system comprising:
at least one memory storing computer-executable instructions; and
at least one processor, wherein the at least one processor is configured to access the at least one memory and to execute the computer-executable instructions to:
receive a notification from an events datastore, wherein the events datastore is associated with a fast key index value, wherein the fast key index value comprises one or more of a version tag, a session identifier, or a set of event keys and a next scan cursor, and wherein the notification is indicative of missing events for the interval of time of a partition of events data;

determine, based at least in part on the fast key index value and the notification, the missing events;

send a request to a primary events datastore, the request indicating the missing events:

obtain, from the primary events datastore, events data for the missing events;

transmit the events data to the events datastore; and update the fast key index value to include the events data.

16. The system of claim 15, wherein the at least one processor is further configured to execute the computer-executable instructions to:

register as a publisher server with a database service registry;

obtain a list of instances of events datastores from the database service registry;

identify the instance of the events datastore from the list of instances of the events datastore; and determine an association with the instance of the events datastore.

17. The system of claim 15, wherein the at least one processor is further configured to execute the computer-executable instructions to:

determine whether the events data are first in a session;

in response to a determination that the events data is first in the session, generate a new events key; and in response to a determination that the event data is not first in the session, modify an existing events key associated with the session.

18. The system of claim 15, wherein the at least one processor is further configured to execute the computer-executable instructions to:

obtain a first set of event keys and a first next scan cursor from the events datastore;

issue a delete range to remove all events before an identified expiry; and delete at least one key before the identified expiry.

19. The system of claim 18, wherein the at least one processor is further configured to execute the computer-executable instructions to:

analyze the first set of event keys to identify at least one key that does not belong on the instance of the events datastore; and delete the at least one key.

20. The system of claim 15, wherein the at least one processor is further configured to execute the computer-executable instructions to:

identify redundant events data in the events datastore; and delete the redundant events data from the events datastore.

\* \* \* \* \*